Patented Aug. 11, 1936

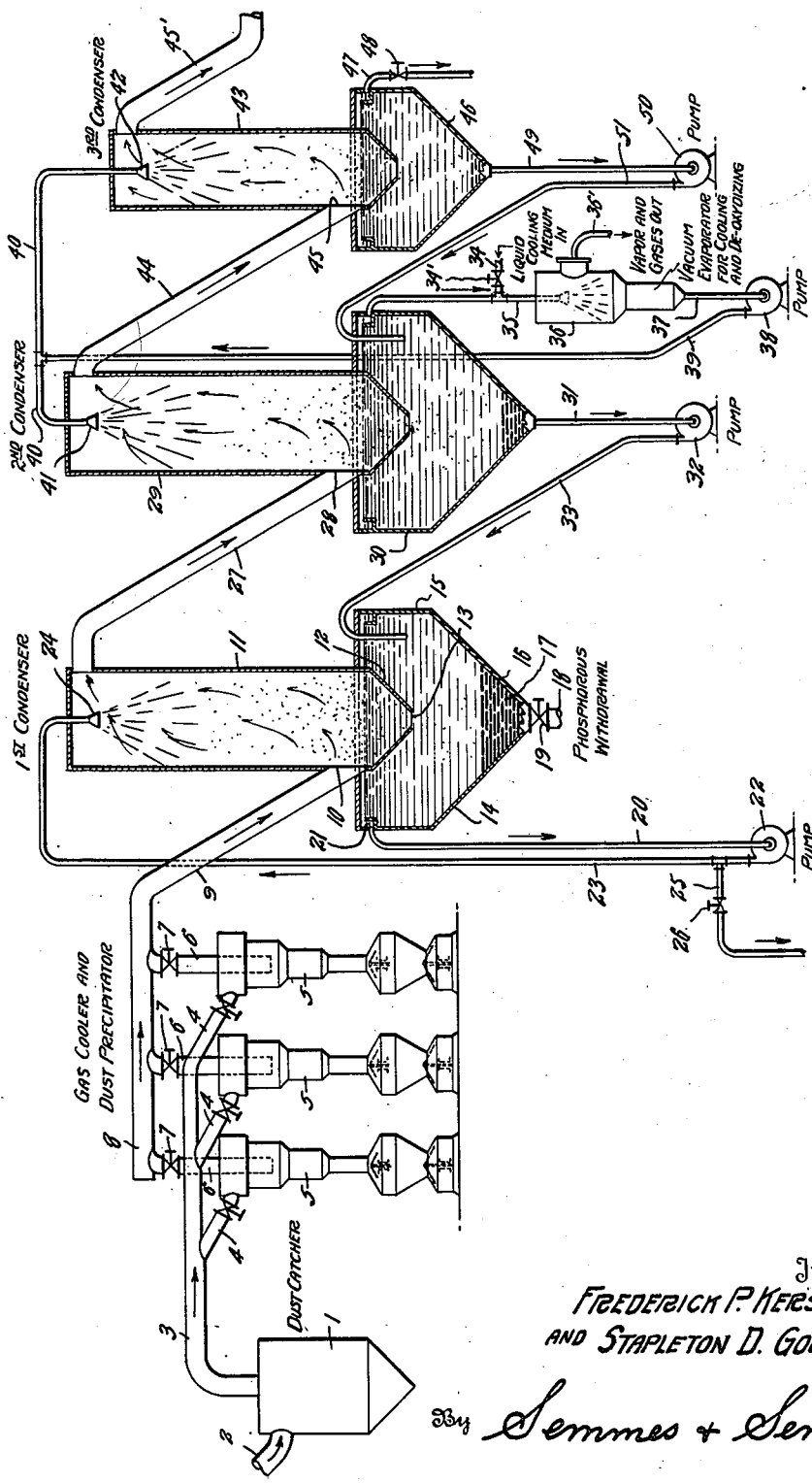

2,050,796

UNITED STATES PATENT OFFICE 2,050,796

RECOVERY OF PHOSPHORUS

Friedrich Paul Kerschbaum, Berlin-Wilmersdorf, Germany, and Stapleton D. Gooch, Lake Wales, Fla.

Application July 14, 1933, Serial No. 680,504
In Germany October 25, 1932

4 Claims. (Cl. 23—223)

This invention relates to the recovery of phosphorus by the volatilization process, and more particularly the recovery of phosphorus from gases which contain this element in relatively high dilution.

It is well known that it is relatively simple to recover phosphorus from gases in which it is contained in higher concentrations, as for example from the effluent gases of an electrical phosphorus furnace. The problem of recovering this phosphorus from blast furnace gases, where the phosphorus vapor is in relatively high dilution, extending usually from about one-tenth to one-twentieth of that contained in electrical furnace gases, is a difficult procedure. As compared to the electric furnace gases these blast furnace gases contain from ten to twenty times the quantity of gas, per weight of phosphorus.

A factor of considerable importance in the recovery of phosphorus from blast furnace gases is the immense quantity of heat required to be withdrawn from the carrier gas. Comparing this thermal problem to that of the similar problem in the recovery of phosphorus from electric furnace gases, it is known that the amount of heat required to be drawn off from the effluent gases of the blast furnace is from twenty to thirty times that abstracted from the electric furnace gases.

It has been proposed heretofore to separate phosphorus from blast furnace gases by first cooling the gases by indirect heat exchange, as by passing them through a system of pipes, and then further cooling the gas by direct cooling, as for example by intimate contact with a liquid cooling medium. In point of fact, however, it has been impossible to carry out this process in practice, principally because the phosphorus, whether in solid or liquid form, settles or precipitates in the cooling pipes, thereby retarding the dissipation of heat from the gases. The phosphorus which settles or collects in the pipes also, to some considerable degree, picks up or absorbs dust from the gases.

It has likewise been proposed heretofore to cool phosphorus or phosphorus oxides containing gases by sprinkling or spraying with fresh water and to then absorb the balance of the phosphorus contained in the gas by some suitable absorbing medium, such as a carbon filter. According to this process the phosphorus vapor, originally contained in the phosphorus gas, is obtained in the form of a dilute suspension. The disadvantage of this type of procedure is the excessive superficial oxidation of the phosphorus particles by the oxygen contained in the cooling water. An accentuated secondary disadvantage resulting from this is that the oxide films formed prevent the union or coalescence of the phosphorus particles. The solid material separates in the form of a mud and even when this is melted under water the solids cannot be changed into a compact volatile phosphorus.

An object of the present invention is to overcome the major disadvantages of prior art processes.

Another object is to provide a process for abstracting phosphorus in compact solid form from gases containing the phosphorus in high dilution.

Another object is to provide an improved method of recovering phosphorus from blast furnace gases.

Yet another object is to provide a special cooling medium of peculiar utility in the recovery of phosphorus from furnace gases.

With these and other equally important objects in view, the present invention is based on the fact that it has been proven possible to obtain phosphorus from phosphorus gases containing it in high dilution, in a compact liquid form by means of a special treatment of the gases with improved cooling media. Improved results are also found to be secured by adding electrolytes to the cooling medium which function to promote the condensation and coagulation of the phosphorus. It has been found that among other substances, hydrofluosilicic acid and its salts are effective in promoting the separation of the phosphorus in the desired form. This material is particularly suitable, especially in view of the fact that the volatile fluorine compounds, such as $SiF_4$, present in the exhaust gases of a phosphorus blast furnace, can be utilized. When employing water as the preferred cooling medium, the water, or other aqueous solution, is capable of reacting with fluorine compounds of the gases to form hydrofluosilicic acids or its salts in situ. As will be noted hereinafter, in carrying out the process care is taken to insure not only the formation of the hydrofluosilicic acid but also to maintain the optimum concentration of this acid or its salts.

The single figure of the drawing diagrammatically illustrates the apparatus employed.

As a general proposition, in carrying out the invention the effluent gases from the phosphorus blast furnace are first passed through the dust collector or remover in such circumstances that the residual dust in the gas does not exceed approximately 5 grams, preferably not more than 1 gram per cubic meter of the gas. This dust-freed gas is then subjected to indirect cooling so as to reduce the temperature to just above the dew point of phosphorus, that is to say between 150 and 300° C. The gas is then contacted with an aqueous cooling medium, as by spraying, and the cooling medium is constantly recirculated to and from the gas zone so that it is made to act repeatedly upon the newly introduced blast furnace gas. The water contacting with the phosphorus-bearing gas produces an aqueous suspension of phosphorus. Due to the recirculation of water and to the presence of hydrofluosilicic acid, or its equivalent, the concentration of the phosphorus is sufficiently increased to promote the precipitation out of the aqueous suspension and the coalescence of the phosphorus particles into largely coherent aggregates of liquid. It is particularly to be noted that this precipitation and coalescence is expedited if the operating temperature is maintained just above the melting point of phosphorus. For example, it has been found that good separation of the phosphorus may be secured by maintaining the acidity of the cooling water from between $\frac{1}{10}$ and 1-normal, and preferably from $\frac{1}{3}$ to 1-normal.

It has been found also in the operation of this process that the acid employed, and particularly the hydrofluosilicic acid, subserves a very advantageous secondary function. This acid tends to dissolve the dust-like particles of calcium phosphate or other calcium containing substances present in the blast furnace dust. The acid reacting with the calcium salts form water soluble substances, such as calcium silicofluoride.

It will be understood that although it is highly desirable to maintain the concentrations of the hydrofluosilicic acid, or its equivalent, at an optimum concentration, this nevertheless may be readily achieved by, for example, suitably adjusting the operating conditions of the blast furnace and/or by suitably regulating the charge to the furnace. It will be appreciated by this latter method that the amount of the fluorine compounds present in the gas may be relatively accurately controlled.

It will be observed also that the control of acidity is to some degree automatic, at least in the higher limits, because of the fact that the dust which has escaped the initial dust removing treatment consumes or takes up certain quantities of the hydrofluosilicic acid by reason of the reaction above noted.

It is particularly to be understood that in operating the process the cooling medium is constantly recirculated in a closed cycle to and from the gas space in the condenser. The recirculation of the cooling medium in a closed cycle has a very decided advantage of eliminating or largely minimizing the introduction of oxygen into the system. This, as noted above, has the desirable effect of minimizing the superficial oxidation of the phosphorus particles.

Considered more specifically, the improved process may be carried out by treating the gases escaping from the blast furnace, which are at a temperature of between 300 and 500° C. or higher, to remove the dust. In this operation precautions should be taken to avoid the condensation of phosphorus. The material is then subjected to a quick cooling so that the temperature is reduced to approximately between 250 and 260° C. An advantage inhering in this cooling treatment is that the tendency to form red phosphorus is considerably minimized inasmuch as the temperature range in which this allotrope is formed is quickly passed. If desired the removal of the dust and the preliminary cooling of the gas may be carried out simultaneously in a very brief period of time by, for example, employing a non-insulated dust precipitating apparatus. During the utilization of such type of apparatus the gases may be brought very rapidly to a temperature only slightly above the dew point of phosphorus, that is to say between 150 and 200° C.

A major advantage of this type of treatment is that it enables the indirect withdrawal of about one-half of the total heat content of the blast furnace gases before condensation of the phosphorus begins.

After this preliminary treatment the gases are subjected to special conditions so as to insure improved condensation. Condensation may be carried out in several stages, for example three, by directly contacting the gas with a recirculating liquid cooling medium. This cooling medium may be employed in all of the stages of condensation but should preferably be employed in at least the first stage. In carrying out this condensation the gases which have been cooled down by the preliminary treatment to the temperature noted, and which are substantially free from dust and substantially dry, are introduced in through the lower part of a suitable condenser, such as a cylindrical container, where they are subjected to intimate contact with the cooling medium. This cooling medium, which as noted comprises an aqueous vehicle of an optimum acidity, is preferably led in countercurrently to the stream of gas and is contacted with the gas in the form of a coarse spray.

As noted, the effect of the recirculating cooling medium is to considerably lower the temperature of the phosphorus and this comes out in the form of an aqueous suspension. The acid content in the cooling medium helps condensation and considerably accelerates the flocculation or coalescence of the smaller particles into larger aggregates. The melted liquid phosphorus collecting in a compact liquid mass in the bottom of the container may be withdrawn continuously or intermittently. The cooling medium which contains only relatively small quantities of phosphorus, in suspended form, is continuously conducted from the upper part of the collecting chamber to the sprinkling device and is thus brought to react directly upon the newly introduced phosphorus bearing gases. The amount of phosphorus particles contained in the recirculated medium is relatively small but this serves advantageously to form nuclei or foci of condensation for the phosphorus in the incoming gas.

In the preferred embodiment of the invention the cooling liquid is maintained in circulation by means of a pump and is preferably so adjusted that from one-fourth to one-half cubic meter of the cooling medium is employed per square meter of condenser section a minute. The cooling liquid is warmed or heated by the heat content of the incoming gases and these gases become practically completely saturated with water vapor. By properly regulating the temperature of the entering gas and by relatively adjusting the velocities of the gas and the cooling liquid a substantially steady thermal state or equilibrium of the cooling medium may be attained. In improved operation the temperature of the cooling medium is kept at between 55 and 70° C., and preferably between 60 and 65°.

Although a fairly wide temperature range of the cooling medium is permitted, it is found that the optimum range, noted above, is conducive to rapid flocculation of the phosphorus suspension and also to the union or coalescence of the phosphorus particles. In addition this temperature was found to accelerate the solution of the residual dust particles. It is found in the present process that the gases attain the temperature of the cooling medium in an extremely short period of time, for example in from fifteen to thirty seconds. By reason of the action of the coarse dense shower of liquid and of the hydrofluosilicic acid contained in the incoming medium, a rapid and coarse separation of the phosphorus is effected in the liquid or aqueous phase. The greater part of the phosphorus contained in the gas can thus be extracted from the first condenser stage in a liquid molten form. During this treatment the phosphorus content of the gas drops from about thirty grams to about three to five grams of phosphorus per cubic meter of gas.

After a stable or stationary state or stage has been reached in the cooling medium and it has reached a substantially constant temperature, the cooling of the gases is effected without any substantial alteration of the heat content of the cooling stage, since the water vapor formed by the heat abstracted from the gas and the condensation of the phosphorus is taken up by the gas, and consequently the quantity of heat absorbed during the formation of the water vapor remains in this stage.

It will be noted that the enrichment or building up of the soluble salt produced by the dissolution of solids in the dust, and enrichment of the silicic acid formed, during the hydrolysis of the hydrofluosilicic acid makes it advisable to replace a part of the cooling medium from time to time.

Thus in the preferred process about one-tenth by volume of fresh liquid is added to the cooling medium in a condenser per day. For this reason, as well as to replace any losses resulting from evaporation, it is practical to use low grade phosphorus suspensions obtained in the latter steps of condensation in lieu of the fresh water.

It is obvious that the replacement of the cooling liquid is made at such a rate as to maintain the acidity at the desired limits set forth herein, i. e., between 1/10 and 1-normal, and preferably from 1/3 to 1-normal.

By the present process it is possible to extract, from the first condenser stage, from 80 to 90% of the phosphorus contained in the gas. This extract is in the form of a liquid substantially free from mud. As a result of the strong flocculating effect of the acid usually only a few grams of phosphorus per liter remains in suspension in the liquid which has been recirculated through the plant, so that this system entails no appreciable loss in phosphorus.

The gases issuing from the first condenser and from which the greater quantity of phosphorus has been removed are then subjected to a similar treatment in a second condenser stage. The conditions within this stage are so controlled that the gases are cooled by direct contact with water and the temperature of this system is preferably maintained at a point above but close to the melting point of phosphorus. In this way it is possible to separate the greater part of the residual phosphorus, in liquid form, in the collecting section of the second condenser. This cooling in the second stage is preferably done by circulating the aqueous vehicle in a closed cycle and by contacting it in the form of a spray with the incoming gas. The temperature control is preferably so exercised that the liquid spray reaches the bottom or collecting section at a temperature of about 40° C.

As in the first condenser the cooling water is drawn off from the upper part of the collecting section and is cycled back to the condenser. In this second condenser section it is preferable to cool the water somewhat before it is recycled. This may be done, for example, in a vacuum expansion evaporator.

The gas remains in this second condenser a very short period of time, usually from about fifteen to thirty seconds. It will be seen from this that the throughput of the system is extraordinarily rapid. The liquid phosphorus which is contained in the second condenser, and if desired a part of the aqueous suspension lying above the liquid phosphorus, may be drawn off from time to time to a separate storage or collecting unit, or may be mixed with the extract from the first condenser.

Losses of water in the second stage may be replaced by fresh water. It is particularly to be noted that in order to minimize any tendency to oxide formations the water utilized in the system may be first treated so as to expel and largely remove any dissolved or entrained oxygen.

The gases discharged from the second condenser are now at a temperature which is only a few degrees above the melting point of phosphorus, i. e. a little above 45° C. This gas contains only a very small quantity of phosphorus, usually about 1.3 to 1.5 grams of phosphorus per cubic meter. In comparison with the gases issuing from the blast furnace the heat content of the residual gas is substantially insignificant and it is due largely to the water vapor contained in the gas. These remaining gases may be treated to recover the residual phosphorus by a third condensation step. In this third condenser the gases may be cooled either directly or indirectly. Separation may be made by utilizing electrostatic fields or centrifugal separating apparatus, such as the vortex apparatus. If the third condensation step is controlled so as to reduce the temperature to about 30° C., only about 1% of the original phosphorus content remains in the gas. The gas left after the third condensation treatment may be discharged or, if desired, the very small content of phosphorus may be recovered by treating the gas by the usual methods, for example by contacting it with adsorbent or treating it with adsorptive media.

The phosphorus which is recovered in the third condensation stage, and which may amount to about 4% of the total amount of phosphorus, is precipitated in the form of a mud. For the purpose of further treatment this may be transferred to the collecting or storage vessel associated with the second or first condensers, where it is by suitable treatment transformed into compact phosphorus.

It will be noted by this procedure that improved results are secured. The throughput of the system is very rapid, thus enabling relatively large quantities of phosphorus gases to be handled effectively in small apparatus, that is to say apparatus of relatively small area. The percentage yield of recovery is extremely high, particularly in view of the time of the treatment. It will also be appreciated that other advantages inhere in this type of process. Since the dust is largely removed in the treatment and since much of the residual dust, i. e. that which escapes the dust collector, is dissolved, the process is very safe, that is to say dangers of explosion are substantially eliminated. The improvements incorporated in the present process involving the minimizing or elimination of oxide formation are also advantageous both in respect of the time of treatment and in quality of the product recovered.

Referring to the drawing, we have shown a dust catcher 1 to which is delivered through a conduit 2 the flue blast furnace gases containing phosphorus in vapor form. A good portion of the larger particles of dust are caught in the dust catcher 1 and the temperature of the gases is somewhat reduced. From the dust catcher the gases and vaporous phosphorus pass through a conduit 3 and branch conduits 4, to a series of dust precipitators of the cyclone type where finer particles of dust are precipitated under centrifugal action. We have indicated the dust collectors generally by the numeral 5. The gases which have now been cooled, as previously described in the specification, pass through a series of conduits 6 controlled by valves 7 into a header conduit 8.

From the header conduit 8 there is a downwardly directed conduit 9 which leads to an opening 10 in the bottom of a spray chamber 11 (1st condenser unit of the drawing). The spray chamber 11 is provided with a conical bottom 12 having an opening 13 therein which discharges into a receiving tank 14 which has a circular wall 15 and a conical bottom 16. The liquid phosphorus 17 is adapted to be withdrawn through a conduit 18 at the apex of the conical bottom 16. This conduit 18 is controlled by a valve 19.

Cooling liquid is circulated by a pipe 20 which communicates with an overflow trough 21 formed on the inner circular wall 15 of receiving tank 14. The cooling liquid passes to a pump 22 and is adapted to be recirculated through a pipe 23 to sprayers 24 located at the top of the spray chamber 11. In practice, a number of sprayers 24 may be used, but in the diagrammatic showing but one is indicated.

There is a branch line 25 communicating with pipe 23 provided with a valve 26. Through this branch line cooling liquid can be withdrawn either continuously or intermittently in order to make room for fresh cooling liquid, as will be later described. By the introduction of fresh de-oxidized cooling liquid to the system and the bleeding off of cooling liquid already in the system we are enabled to maintain the desired acidity of the cooling medium which, as before stated in the specification, lies in general between $\frac{1}{10}$-normal and 1-normal.

From the spray chamber 11 there is a downwardly directed conduit 27 which leads to an opening 28 in the bottom of a second spray chamber 29. The second spray chamber 29 is formed as previously described in connection with spray chamber 11. Leading from the bottom of a receiving tank 30 is a pipe 31 which passes to pump 32. Through the pipe 31 is withdrawn liquid phosphorus condensed in receiving tank 30 and cooling medium which is pumped by pump 32 through a pipe 33 into the receiving tank 14. It is to be noted that both receiving tanks 14 and 30, as well as the receiving tank in the third condensing unit about to be described, are all provided with covers to minimize the absorption of oxygen by the cooling liquid.

Fresh cooling liquid is introduced into the system through a pipe 34, provided with a valve 34', which leads into a line 35. The line 35 passes into a vacuum evaporator 36 for cooling and de-oxidizing the cooling medium. Here the cooling medium is subjected to vacuum which may be created by steam jets, or other vacuum creating means, and the dissolved oxygen is largely removed therefrom. We have merely shown this equipment digrammatically for the purposes of simplicity in description. The vapors and gases which pass out of this vacuum evaporator leave through a pipe 36'.

Leading from the de-oxidizer and cooler 36 is the de-oxidized liquid cooling medium which passes down through the pipe 37 to a pump 38. The pump 38 delivers the cooling medium through a line 39 to a line 40 which continues to nozzles 41 in the spray chamber 29. The pipe 40 also leads to nozzles 42 located in a third spray chamber 43, that is somewhat smaller than the other spray chamber. Gases containing phosphorus pass down from the top of the spray chamber 29 through a conduit 44 to an opening 45 located at the bottom of the spray chamber 43. Washed gas and vapors are withdrawn through a conduit 45' for storage or to be burned. The spray chamber 43 is provided with a receiving tank 46. Tank 46 is somewhat smaller than tanks 30 and 14 but is of similar construction. There is a line 47 provided with a valve 48 through which cooling liquid may be withdrawn from the system.

From a draw-off line 49 which communicates with the apex of the conical bottom of the receiving tank 46 is withdrawn phosphorus and cooling medium which passes to a pump 50 whence it is forced through a line 51 into the receiving tank 30.

The system which we have described provides for the quick cooling of the flue gases in the early stage of the process to a point above the dew point of the phosphorus, but below that point at which there is much danger of the formation of red phosphorus. The flue gases are then treated to successive actions in the 1st, 2nd and 3rd condensers, where vaporous phosphorus is caused to assume liquid form and collect in the bottom of settling tanks for each of these condensers.

Means are provided for bleeding cooling medium from the system and introducing fresh cooling medium whereby the desired acidity of the cooling medium can be maintained within definite limits. The vacuum evaporator precools and de-oxidizes the cooling medium. In the system which we employ the cooling medium is de-oxidized at the start of the operation and before it gets in contact with any of the phosphorus containing gases. If this were not the case, there would be danger of the formation of sludgy, muddy, phosphorus oxides which are highly undesirable.

A preferred type of process has been described in order to enable those skilled in the art to effectually carry it out. This process, however, is given merely to exemplify the principles of the invention and not for the purpose of defining the limits of the inventive concepts. The invention is considered to reside in the improvements as defined by the appended claims.

We claim:
1. A continuous process of recovering phosphorus from gases containing the phosphorus in high dilution which comprises subjecting the phosphorus containing gases to direct contact with an aqueous cooling medium of acidity of between $\frac{1}{10}$ and 1-normal, and withdrawing part of the cooling medium and replacing it with fresh cooling medium to prevent the accumulation of acid therein above 1-normal acidity.

2. A continuous process of recovering phosphorus from gases containing the phosphorus in high dilution which comprises subjecting the phosphorus containing gases to direct contact with an aqueous cooling medium of acidity of between $\frac{1}{10}$ and 1-normal, and withdrawing part of the cooling medium and replacing it with fresh cooling medium to prevent the accumulation of acid therein above 1-normal acidity while maintaining the rate of withdrawal such that the acidity of the cooling medium does not fall below $\frac{1}{10}$ normal.

3. A continuous process of recovering phosphorus from gases containing the phosphorus in a high dilution which comprises subjecting the phosphorus containing gases to direct contact with an aqueous cooling medium of acidity of between $\frac{1}{3}$ and 1-normal, and withdrawing part of the cooling medium and replacing it with fresh cooling medium to prevent accumulation of acid therein above 1-normal acidity.

4. A continuous process of recovering phosphorus from gases containing the phosphorus in a high dilution which comprises subjecting the phosphorus containing gases to direct contact with an aqueous cooling medium of acidity of between $\frac{1}{3}$ and 1-normal, and withdrawing part of the cooling medium and replacing it with fresh cooling medium to prevent accumulation of acid therein above 1-normal acidity while maintaining the rate of withdrawal such that the acidity of the cooling medium does not fall below $\frac{1}{3}$ normal.

FRIEDRICH PAUL KERSCHBAUM.
STAPLETON D. GOOCH.